(12) United States Patent
Tamaki et al.

(10) Patent No.: US 10,516,280 B2
(45) Date of Patent: Dec. 24, 2019

(54) INFORMATION PROCESSING SYSTEM, INFORMATION PROCESSING DEVICE, OPERATION DEVICE, AND POWER SUPPLY METHOD

(71) Applicant: NINTENDO CO., LTD., Kyoto (JP)

(72) Inventors: Yuki Tamaki, Kyoto (JP); Hideto Matoba, Kyoto (JP); Ryo Fukasawa, Kyoto (JP); Shumpei Yasuda, Kyoto (JP); Yasuyuki Shimohata, Kyoto (JP); Toshiki Oizumi, Kyoto (JP)

(73) Assignee: NINTENDO CO., LTD., Kyoto (JP)

( * ) Notice: Subject to any disclaimer, the term of this patent is extended or adjusted under 35 U.S.C. 154(b) by 183 days.

(21) Appl. No.: 15/455,526

(22) Filed: Mar. 10, 2017

(65) Prior Publication Data
US 2018/0138727 A1  May 17, 2018

(30) Foreign Application Priority Data

Nov. 11, 2016  (JP) .................................. 2016-220726

(51) Int. Cl.
*H02J 7/00*  (2006.01)
*H02J 7/14*  (2006.01)
(Continued)

(52) U.S. Cl.
CPC ............ *H02J 7/0052* (2013.01); *A63F 13/23* (2014.09); *A63F 13/235* (2014.09); *A63F 13/24* (2014.09); *A63F 13/25* (2014.09); *A63F 13/92* (2014.09); *G06F 1/1626* (2013.01); *G06F 1/1669* (2013.01); *G06F 1/1671* (2013.01);
(Continued)

(58) Field of Classification Search
USPC ........ 320/107, 108, 114, 115, 137, 134, 132
See application file for complete search history.

(56) References Cited

U.S. PATENT DOCUMENTS 5,558,577 A * 9/1996 Kato ....................... A63F 13/06
340/2.1
8,949,477 B2 * 2/2015 Drasnin ................ G06F 9/4415
710/8

(Continued)

FOREIGN PATENT DOCUMENTS

JP  2005-012526  1/2005

OTHER PUBLICATIONS

Extended European Search Report dated Sep. 20, 2017 issued in European Application No. 17160051.3 (7 pgs.).

*Primary Examiner* — Alexis B Pacheco
(74) *Attorney, Agent, or Firm* — Nixon & Vanderhye, P.C.

(57) ABSTRACT

An example information processing system includes a main device, and an operation device attachable to the main device. The operation device includes a first control circuit, a first battery, and a first power supply circuit. The main device includes a second control circuit, a second battery, and a second power supply circuit. The second power supply circuit supplies power from the second battery to the operation device in response to satisfaction of a condition about the amount of remaining charge indicated by the remaining charge amount information transmitted from the operation device. When power is supplied from the main device to the operation device, the first power supply circuit supplies power supplied from the main device to the first control circuit, instead of power from the first battery.

14 Claims, 7 Drawing Sheets

(51) Int. Cl.
   *A63F 13/23*    (2014.01)
   *A63F 13/24*    (2014.01)
   *A63F 13/25*    (2014.01)
   *A63F 13/92*    (2014.01)
   *G06F 1/26*     (2006.01)
   *A63F 13/235*   (2014.01)
   *G06F 1/16*     (2006.01)
   *G06F 3/023*    (2006.01)

(52) U.S. Cl.
   CPC ............ *G06F 1/266* (2013.01); *G06F 3/0231* (2013.01); *H02J 7/0047* (2013.01); *H02J 2007/005* (2013.01); *H02J 2007/0096* (2013.01)

(56) References Cited

U.S. PATENT DOCUMENTS

| | | | |
|---|---|---|---|
| 9,250,678 B2* | 2/2016 | Sasaki | G06F 1/26 |
| 2003/0030412 A1* | 2/2003 | Matsuda | G06F 1/263 |
| | | | 320/127 |
| 2005/0002350 A1* | 1/2005 | Ono | A63F 13/02 |
| | | | 370/328 |
| 2013/0232350 A1* | 9/2013 | Belesiu | G06F 1/26 |
| | | | 713/300 |
| 2013/0281213 A1* | 10/2013 | Yasuda | A63F 13/42 |
| | | | 463/39 |
| 2013/0290764 A1* | 10/2013 | Taki | G06F 1/266 |
| | | | 713/340 |
| 2015/0301959 A1* | 10/2015 | Mahlmeister | A63F 13/22 |
| | | | 710/8 |
| 2016/0361633 A1* | 12/2016 | Fujita | A63F 13/23 |

* cited by examiner

INFORMATION PROCESSING SYSTEM, INFORMATION PROCESSING DEVICE, OPERATION DEVICE, AND POWER SUPPLY METHOD

CROSS REFERENCE TO RELATED APPLICATIONS

The disclosure of Japanese Patent Application No. 2016-220726, filed Nov. 11, 2016, is incorporated herein by reference.

FIELD

The technology disclosed herein relates to an information processing system which includes an information processing device and an operation device attachable to the information processing device.

BACKGROUND AND SUMMARY

An information processing system including a main device and an operation device is known. In such an information processing system, when the main device and the operation device are connected together via a wire, the operation device is driven by power supplied from the main device. When the main device and the operation device wirelessly communicate with each other, the operation device is driven by power from its own built-in battery.

When the operation device is connected with the main device via a wire, the range within which the operation device can be used is limited, which is inconvenient. When the operation device and the main device are wirelessly communicating with each other, then if the battery in the operation device becomes dead, the operation device can no longer be used. Therefore, it is desirable to maintain the power of the battery in the operation device as long as possible.

With the above in mind, the present application discloses an information processing system, information processing device, operation device, and power supply method which can improve the convenience of an operation device.

(1) An example non-limiting information processing system described herein includes a main device, and an operation device attachable to the main device.

The operation device includes a first control circuit, a first battery, a first power supply circuit, and a remaining charge amount information transmission circuit. The first control circuit controls at least a portion of the operation device. The first battery supplies power to the first control circuit. The first power supply circuit allows power supply from the first battery to the first control circuit. The remaining charge amount information transmission circuit transmits, to the main device, remaining charge amount information indicating the amount of charge remaining in the first battery.

The main device includes a second control circuit, a second battery, and a second power supply circuit. The second control circuit controls at least a portion of the main device. The second battery supplies power to the second control circuit. The second power supply circuit allows power supply from the second battery to the second control circuit.

The second power supply circuit supplies power from the second battery to the operation device in response to satisfaction of a condition about the amount of remaining charge indicated by the remaining charge amount information transmitted from the remaining charge amount information transmission circuit. When power is supplied from the main device to the operation device, the first power supply circuit supplies power supplied from the main device to the first control circuit, instead of power from the first battery.

According to the configuration (1), power is supplied from the main device to the operation device in response to satisfaction of the condition about the amount of charge remaining in the first battery. Therefore, the occurrence of the situation where the amount of charge remaining in the first battery of the operation device becomes zero, so that the operation device can no longer be used, can be reduced. Thus, the convenience of the operation device can be improved. In addition, the main device does not always supply power to the operation device when the operation device is in the connected state, and supplies power in response to satisfaction of the condition about the amount of charge remaining in the first battery. Therefore, the power of the second battery of the main device can be efficiently used. As a result, the duration in which the information processing system can be used can be extended. Thus, the convenience of the operation device and the information processing system can be improved.

(2) The operation device may further include an operation unit. The remaining charge amount information transmission circuit may include a first communication interface configured to perform wired communication with the main device. The main device may further include a second communication interface configured to perform wired communication with the operation device. The remaining charge amount information transmission circuit may transmit operation information indicating an operation performed on the operation unit, and the remaining charge amount information, to the main device by the wired communication through the first communication interface. The second power supply circuit, when determining to supply power to the operation device, may supply power from the second battery to the operation device through the second communication interface.

According to the configuration (2), power supply is performed through the communication interfaces which perform wired communication between the main device and the operation device, and the remaining charge amount information is transmitted through the communication interfaces. As a result, the main device can acquire the remaining charge amount information from the operation device without using wireless communication.

(3) The second control circuit may performs a predetermined information process on the basis of the operation information transmitted from the remaining charge amount information transmission circuit.

(4) The operation device may further include an operation unit. The remaining charge amount information transmission circuit may further include a third communication interface configured to perform wireless communication with the main device. The main device may further include a fourth communication interface configured to perform wireless communication with the operation device. The remaining charge amount information transmission circuit may transmit operation information indicating an operation performed on the operation unit, and the remaining charge amount information, to the main device by the wireless communication through the third communication interface.

According to the configuration (4), the operation device can transmit information to the main device by the wireless communication. The user can use the operation device in the detached state. Therefore, the configuration (4) can further improve the convenience of the operation device.

(5) The second control circuit may performs a predetermined information process on the basis of the operation information transmitted from the remaining charge amount information transmission circuit.

(6) When the operation device is performing the wireless communication with the main device, the first power supply circuit may supply power from the first battery to the first control circuit.

According to the configuration (6), the operation device, when performing the wireless communication, can be driven by power from its own built-in battery, i.e. the first battery.

(7) When the operation device is performing the wireless communication with the main device, even if the condition about the amount of remaining charge is satisfied, the first power supply circuit may supply power from the first battery to the first control circuit.

(8) The main device may further include a power terminal configured to acquire of power supplied from a power source external to the main device. When the second power supply circuit is supplied with power from the power source device through the power terminal, the second power supply circuit may supply power supplied from the power source to the second control circuit, and supply power supplied from the power source to the operation device.

According to the configuration (8), when external power is supplied to the main device, the information processing system can be driven without consumption of power of the second battery of the main device.

(9) When the first power supply circuit is supplying power from the first battery to the first control circuit, then if power is supplied from the main device to the operation device, the first power supply circuit may stop supplying power from the first battery to the first control circuit, and start supplying power supplied from the main device to the first control circuit.

According to the configuration (9), the operation device, when supplied with power from the main device, can reduce power consumption of its own built-in battery, i.e. the first battery.

(10) When power is supplied from the main device to the operation device, the first power supply circuit may supply power supplied from the main device to the first control circuit, and charge the first battery using power supplied from the main device.

According to the configuration (10), when power is supplied from the main device to the operation device, the operation device can charge its own built-in battery, i.e. the first battery. As a result, the user can use the operation device while the operation device is being charged, and therefore, the convenience of the operation device can be improved.

(11) When the second power supply circuit is supplying power to the operation device, then if the amount of remaining charge indicated by the remaining charge amount information transmitted from the remaining charge amount information transmission circuit is greater than or equal to a first value, the second power supply circuit may stop supplying power to the operation device. When the second power supply circuit is not supplying power to the operation device, then if the amount of remaining charge indicated by the remaining charge amount information transmitted from the remaining charge amount information transmission circuit is smaller than a second value which is smaller than the first value, the second power supply circuit may start supplying power to the operation device.

According to the configuration (11), the main device determines whether or not to supply power from the main device to the operation device, using different values depending on whether or not power is being supplied from the main device to the operation device. Thus, by using such different values, the frequency of repetition of the starting and stopping of power supply can be reduced.

(12) In the information processing system, there may be a plurality of the operation devices attachable to the main device. The second power supply circuit may supply power from the second battery to any operation device that has transmitted the remaining charge amount information satisfying the condition, of the plurality of operation devices attached to the main device.

According to the configuration (12), a plurality of operation devices can be simultaneously attached to the main device. Therefore, the convenience of the operation device can be improved. In addition, according to the configuration (12), the main device determines whether or not to supply power to operation devices separately. Therefore, the main device can control power supply to operation devices separately, resulting in efficient power supply to the operation devices.

(13) The operation device may further include an operation unit. The second control circuit may execute a game process on the basis of an operation performed on the operation unit.

According to the configuration (13), in the information processing system capable of executing a game process, the convenience of the operation device (and the information processing system) can be improved.

(14) When the amount of charge remaining in the second battery is smaller than or equal to a predetermined value, the second power supply circuit may stop supplying power from the second battery to the operation device, regardless of the amount of remaining charge indicated by the remaining charge amount information transmitted from the remaining charge amount information transmission circuit.

According to the configuration (14), when the amount of charge remaining in the second battery of the main device becomes small, the main device stops supplying power to the operation device. Therefore, the rate of decrease of the amount of charge remaining in the second battery of the main device can be reduced, and therefore, the duration in which the main device can be used can be extended.

(15) Another example non-limiting information processing system described herein includes a portable main device, and two operation devices simultaneously attachable to the main device.

Each of the operation devices includes a first control circuit, a first battery, a first power supply circuit, a first communication interface, and a second communication interface. The first control circuit controls at least a portion of the operation device. The first battery supplies power to the first control circuit. The first power supply circuit allows power supply from the first battery to the first control circuit. The first communication interface is configured to perform wired communication with the main device. The second communication interface is configured to perform wireless communication with the main device.

The main device includes a second battery, a second battery, a second power supply circuit, a third and a fourth communication interface, and a fifth communication interface. The second control circuit controls at least a portion of the main device. The second battery supplies power to the second control circuit. The second power supply circuit supplies power from the second battery to the second control circuit. The third and fourth communication interfaces are configured to perform wired communication with the respective operation devices. The fifth communication interface is configured to perform wireless communication with the operation devices.

For any of the operation devices that is connected with the main device by the wired communication, the second power supply circuit supplies power from the second battery to said operation device in response to satisfaction of a condition that the main device is connected with said operation device by the wired communication. In each of the operation devices, the first power supply circuit supplies power from the first battery to the first control circuit when said operation device is not connected with the main device by the wired communication.

According to the configuration (15), the user can use the two operation devices both with and without the wired communication, resulting in an improvement in the convenience of the operation devices. Furthermore, according to the configuration (15), when the wired communication is performed, power is supplied from the main device to an operation device, and therefore, the occurrence of the situation where the amount of charge remaining in the first battery becomes zero, so that the operation device can no longer be used, can be reduced. As a result, the convenience of the operation devices can be further improved.

Note that disclosed herein are a non-limiting example of the main device (in other words, the information processing device) included in the information processing system as set forth in (1)-(15), and a non-limiting example of the operation device included in the information processing system. In addition, disclosed herein is a non-limiting example of a power supply method executed in the information processing system as set forth in (1)-(15).

According to the above information processing system, information processing device, operation device, and power supply method, the convenience of the operation device can be improved.

These and other objects, features, aspects and advantages of the present exemplary embodiment will become more apparent from the following detailed description of the present exemplary embodiment when taken in conjunction with the accompanying drawings.

DETAILED DESCRIPTION OF NON-LIMITING EXAMPLE EMBODIMENTS

[1. Overview of Information Processing System]

Figure 1:
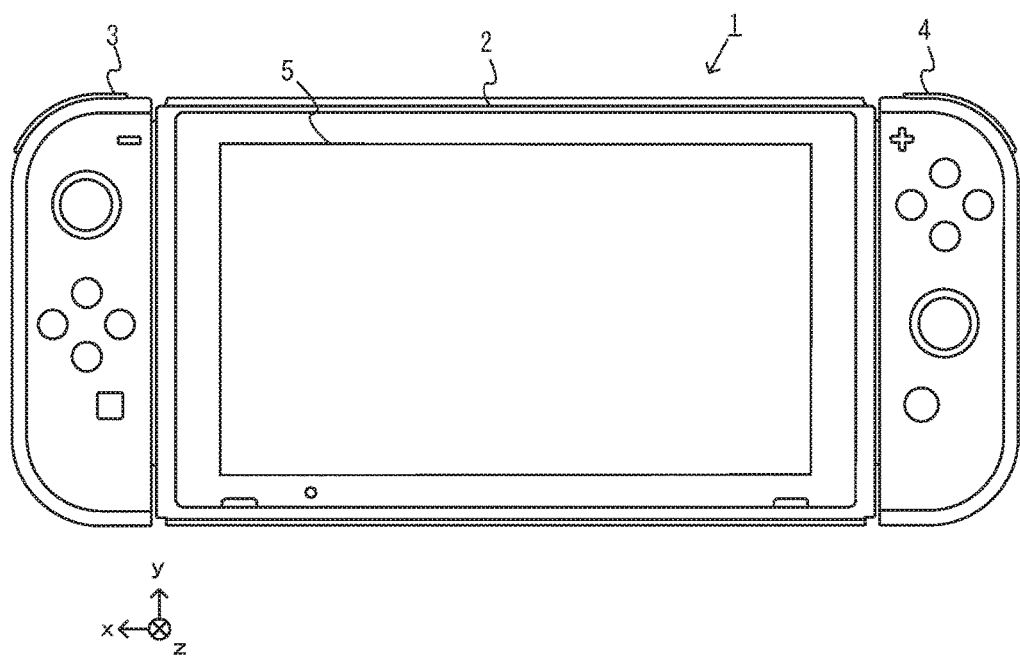
FIG. 1 is a diagram showing an example non-limiting external appearance of an information processing system according to a non-limiting example embodiment.

FIG. 1 is a diagram showing an example non-limiting external appearance of an information processing system according to a non-limiting example embodiment. As shown in FIG. 1, the information processing system 1 includes a main device 2, a left controller 3, and a right controller 4.

The main device 2 is an information processing device which executes various processes in the information processing system 1. The main device 2 has a display 5. The main device 2 has information processing units such as a CPU, a memory, and the like (including a main-device control circuit described below). In this embodiment, the main device 2 can execute a game process by executing a game program which is stored in its own built-in storage unit or in a storage medium removably attached to the main device 2.

The left controller 3 and the right controller 4 are an example non-limiting operation device (also referred to as an "input device") for allowing the use to perform inputting to the information processing system 1. In this embodiment, the controllers 3 and 4 each have an operation unit (specifically, a button and a stick). Note that the left controller 3 and the right controller 4 may hereinafter be collectively referred to as "the controllers."

In this embodiment, the controllers may be attached (also referred to as "connected") to the main device 2. The left controller 3 may be attached to the left side of the main device 2 (i.e., in the positive direction of an x-axis shown in FIG. 1 from the center of the main device 2). The right controller 4 may be attached to the right side of the main device 2 (i.e., in the negative direction of the x-axis shown in FIG. 1 from the center of the main device 2).

As shown in FIG. 1, in a state where the controllers are attached to the main device 2 (hereinafter referred to as "the attached state"), the main device 2 and the controllers have a fixed positional relationship therebetween. Therefore, the user can hold the information processing system 1 (i.e., the main device 2 and the controllers) in the attached state as an integrated structure. Therefore, the information processing system 1 can be said to be a portable information processing device (or a game device).

Figure 2:
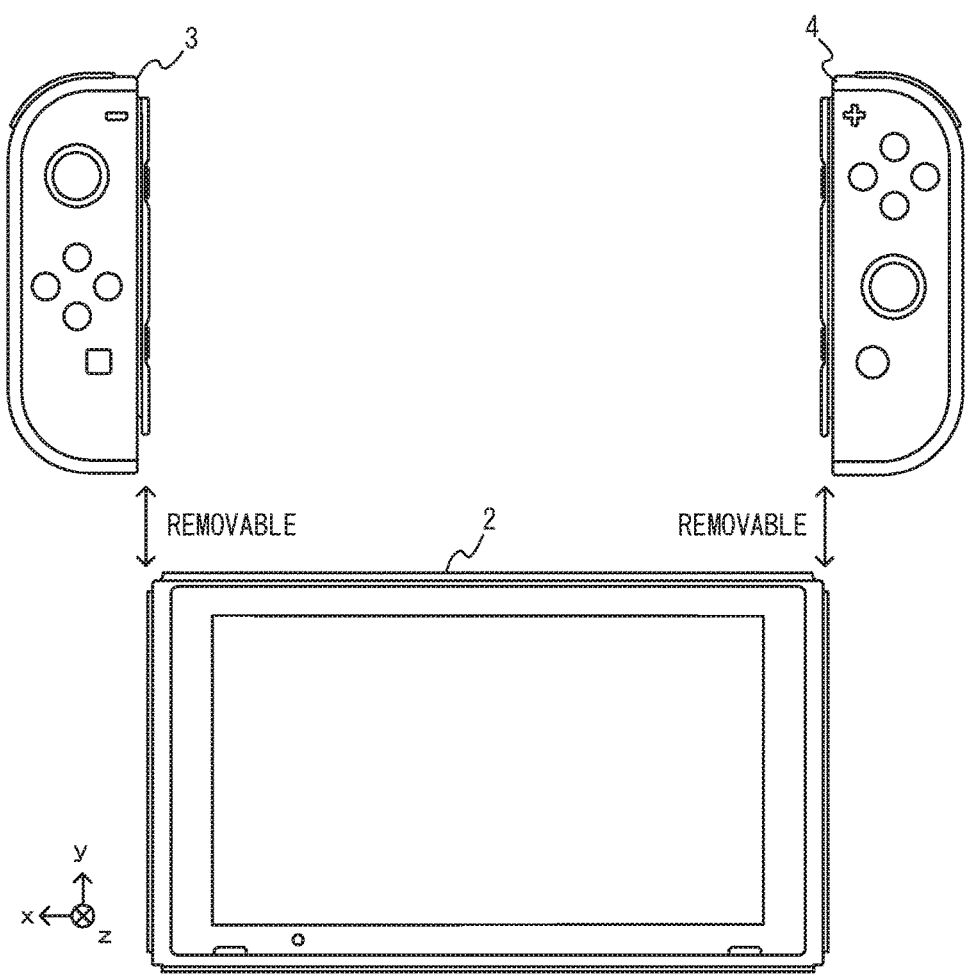
FIG. 2 is a diagram showing an example non-limiting external appearance of the information processing system when example non-limiting controllers are removed from an example non-limiting main device.

FIG. 2 is a diagram showing an example non-limiting external appearance of the information processing system when the controllers are removed from the main device. As shown in FIGS. 1 and 2, the controllers are removably attached to the main device 2. In this embodiment, the controllers can be used in a state where the controllers are removed from the main device 2 (hereinafter referred to as "the detached state"). Thus, in the information processing system 1 of this embodiment, when the controllers 3 and 4 are attached to the main device 2, the user can hold and use the entire information processing system 1, and in addition, when the controllers 3 and 4 are removed from the main device 2, the user can hold and use the controllers alone.

Note that the main device 2 can be coupled to a display device not shown (e.g., a television), and can transmit an image to the display device, which then displays the image. Therefore, the user can use the information processing system 1 in such a manner that the user operates the controllers removed from the main device 2 while viewing an image displayed on a display device coupled to the main device 2.

The controllers may be removably attached to the main device 2 by any suitable means. For example, in this embodiment, a rail member is provided on each of side faces (i.e., side faces in the x-axis direction) of the main device 2, while a slider which is engaged with the rail member so that the slider can be slid with respect to the rail member is provided on a side face of each controller. The user can attach the controllers to the main device 2 by engaging the sliders of the controllers with the respective rail members of the main device 2.

In this embodiment, the two controllers 3 and 4 can be simultaneously attached to the main device 2 (see FIG. 1). Note that, in another non-limiting example embodiment, any suitable number of controllers may be simultaneously attached to the main device 2. In this embodiment, the controllers are attached to the side faces of the main device 2. Alternatively, in another non-limiting example embodiment, the controllers may be attached to other portions of the main device.

[2. Configuration of Each Device in Information Processing System]

Figure 3:
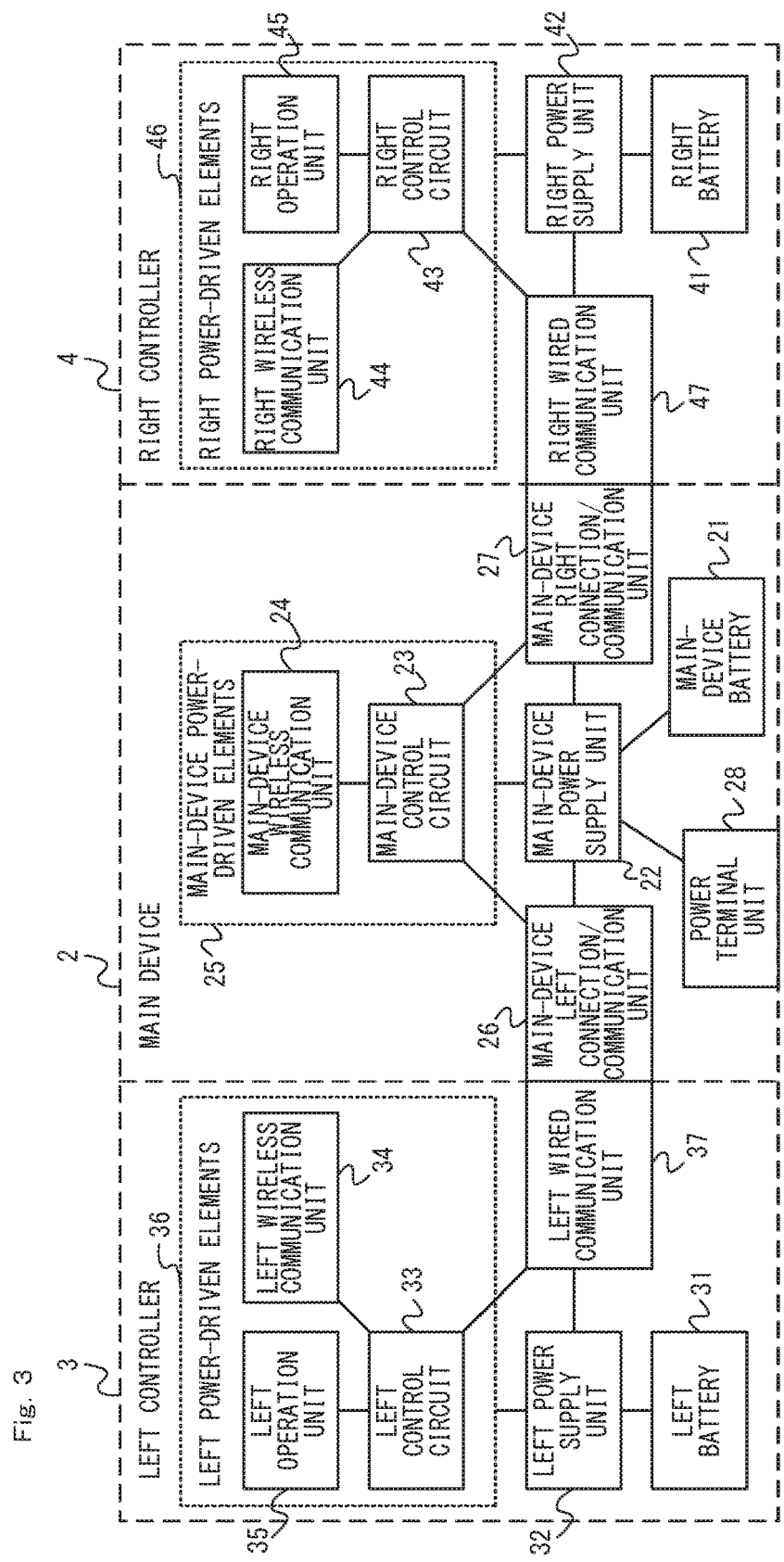
FIG. 3 is a block diagram showing an example non-limiting internal configuration of each device in the information processing system.

FIG. 3 is a block diagram showing an example non-limiting internal configuration of each device (i.e., the main device or the controllers) in the information processing system. Specific example non-limiting internal configurations of the main device 2 and each of the controllers 3 and 4 will now be described with reference to FIG. 3.

(2-1. Configuration of Main Device)

As shown in FIG. 3, the main device 2 has a main-device battery 21 for supplying power to predetermined elements to be supplied with power. Here, the elements to be supplied with power are electronic members which are included in the main device 2 and are driven by power (specifically, including various control circuits, a CPU, etc.). Here, main-device power-driven elements 25 described below correspond to the elements to be supplied with power.

The main device 2 has a main-device power supply unit 22 which supplies power from the main-device battery 21 to the above elements to be supplied with power. The main-device battery 21 is coupled to the main-device power supply unit 22. The main-device power supply unit 22 is coupled to the above predetermined elements to be supplied with power (i.e., the main-device power-driven elements 25 described below). In this embodiment, the main-device power supply unit 22 supplies power to each of the controllers 3 and 4 under a predetermined condition, in addition to the main-device power-driven elements 25, as described in detail below. Therefore, the main-device power supply unit 22 has a booster circuit for increasing the voltage of power supplied to the controllers to a predetermined voltage (i.e., a voltage which allows charging of a battery in each of the controllers).

The main device 2 has a main-device control circuit 23 which controls at least a portion of the main device 2. The main-device control circuit 23 includes various circuits for controlling the main device 2, such as a CPU and a memory. The main-device control circuit 23 also includes a control circuit for controlling a sensor, an input/output unit, and/or a wireless communication unit which are included in the main device 2. The main device 2 also has a main-device wireless communication unit 24. The main-device wireless communication unit 24 includes an antenna for wireless communication with each of the controllers 3 and 4. The main-device wireless communication unit 24 is coupled to the main-device control circuit 23.

Note that, in this embodiment, the main-device control circuit 23 and the main-device wireless communication unit 24 are included in the main-device power-driven elements 25. In other words, the main-device power supply unit 22 supplies power to at least the main-device control circuit 23 and the main-device wireless communication unit 24. Note that the main-device power-driven elements 25 include any electronic members such as a sensor (e.g., an acceleration sensor or a gyroscopic sensor) and an input/output unit (e.g., a touchscreen or a display) which are included in the main device 2.

The main device 2 has a main-device left connection/communication unit 26 which can communicate with the left controller 3 via a wire, and a main-device right connection/communication unit 27 which can communicate with the right controller 4 via a wire. The connection/communication units 26 and 27 are each coupled to the main-device power supply unit 22 and the main-device control circuit 23. The connection/communication units 26 and 27 each have a plurality of terminals. In this embodiment, the connection/communication units 26 and 27 each include a communication terminal for transmitting and receiving information, and a power terminal for exchanging power.

When the main device 2 and the left controller 3 are in the attached state, the main-device left connection/communication unit 26 is connected with a communication unit (a left wired communication unit 37 described below) of the left controller 3. Specifically, in the attached state, the terminals of the main-device left connection/communication unit 26 are in contact with the respective corresponding terminals of the left wired communication unit 37 of the left controller 3. As a result, the main device 2 is electrically connected with the left controller 3. In this regard, the right controller 4 is similar to the left controller 3. When the main device 2 and the right controller 4 are in the attached state, the main-device right connection/communication unit 27 is connected with the communication unit (a right wired communication unit 47 described below) of the right controller 4, so that the main device 2 is electrically connected with the right controller 4.

The terminals of the communication units in the main device 2 and the controllers may specifically take any suitable structure. For example, each terminal is provided at a position where that terminal is in contact with a respective corresponding terminal when the main device 2 and the controllers are in the attached state.

The main device 2 has a power terminal unit 28 which can acquire power supplied from a power source external to the main device 2. The power terminal unit 28 is a member (e.g., a connector) for electrically connecting a charger not shown (e.g., an AC adaptor, etc.) to the main device 2. For example, the power terminal unit 28 may be a USB connector (more specifically, a female connector). In this embodiment, an AC adaptor can be connected to the power terminal unit 28, and the main device 2 can acquire commercial power supply through the AC adaptor.

(2-2. Configuration of Each Controller)

As shown in FIG. 3, the left controller 3 has a left battery 31 for supplying power to predetermined elements to be supplied with power. In this embodiment, left power-driven elements 36 described below correspond to the predetermined elements to be supplied with power. Note that, in this embodiment, the capacity of the left battery 31 is smaller than that of the main-device battery 21.

The left controller 3 has a left power supply unit 32 for supplying power from the left battery 31 to the above elements to be supplied with power. The left battery 31 is coupled to the left power supply unit 32. The left power supply unit 32 is coupled to the left power-driven elements 36. The left power supply unit 32 supplies power (the power of the battery 31 or power supplied from the main device 2)

to the above elements to be supplied with power. The left power supply unit 32 also charges the left battery 31 with power supplied from the main device 2.

The left controller 3 has a left control circuit 33, a left wireless communication unit 34, and a left operation unit 35. The left control circuit 33 controls at least a portion of the left controller 3, and includes a control circuit for controlling, for example, a sensor (e.g., an acceleration sensor or a gyroscopic sensor) which is included in the left controller 3, the left wireless communication unit 34, and/or the left operation unit 35. The left wireless communication unit 34 includes an antenna for wireless communication with the main device 2. The left operation unit 35 includes a button and a stick provided on the left controller 3.

In this embodiment, the left control circuit 33, the left wireless communication unit 34, and the left operation unit 35 are included in the left power-driven elements 36. Specifically, the left power supply unit 32 supplies power to at least the left control circuit 33, the left wireless communication unit 34, and the left operation unit 35. Note that the left power-driven elements 36 may include any electronic members such as a sensor included in the left controller 3 and the like.

The left controller 3 has the left wired communication unit 37 which can communicate with the main device 2 via a wire. The left wired communication unit 37 is coupled to the left power supply unit 32 and the left control circuit 33. In this embodiment, the left wired communication unit 37 has as many terminals as there are terminals included in the main-device left connection/communication unit 26 of the main device 2. More specifically, the terminals include a communication terminal for transmitting and receiving information, and a power terminal for exchanging power.

As shown in FIG. 3, the right controller 4 has constituent elements 41-47 similar to the constituent elements 31-37 of the left controller 3. Specifically, the right battery 41 corresponds to the left battery 31. The right power supply unit 42 corresponds to the left power supply unit 32. The right control circuit 43 corresponds to the left control circuit 33. The right wireless communication unit 44 corresponds to the left wireless communication unit 34. The right operation unit 45 corresponds to the left operation unit 35. The right wired communication unit 47 corresponds to the left wired communication unit 37. The constituent elements 41-47 of the right controller 4 each have a function similar to that of the respective corresponding one of the constituent elements 31-37 of the left controller 3, and can operate in a similar manner.

Note that the left controller 3 and the right controller 4 may not have exactly the same configuration and may have different configurations. For example, only one of the left controller 3 and the right controller 4 may have a specific operation unit and/or sensor. The left controller 3 and the right controller 4 may have different external appearances, or different arrangements of the constituent elements (e.g., a button and a stick).

[3. Overview of Operations in Information Processing System]

Next, an overview of operations in the information processing system 1 will be described. In the description that follows, operations involved with communication between the main device 2 and the controllers, and operations involved with power supply from the main device 2 to the controllers, will be mainly described. Note that, in the description that follows, operations between the main device 2 and the left controller 3 will be mainly described. Operations between the main device 2 and the right controller 4 are similar to those between the main device 2 and the left controller 3, and therefore, will not be described in detail.

(3-1. Operations Involved with Communication)

In this embodiment, the left controller 3 transmits controller information to the main device 2 at a rate of once per predetermined period of time. The controller information includes operation information indicating an operation performed on an operation unit (i.e., the left operation unit 35), and remaining charge amount information indicating the amount of charge remaining in the left battery 31. Here, remaining charge amount information about a battery is any information that can be used to estimate (or calculate) or determine the amount of charge remaining in the battery. Specifically, the remaining charge amount information about a battery may be voltage information indicating the voltage of the battery, or information indicating the value of a proportion (e.g., a percentage or a fraction) indicating the amount of charge remaining in the battery, which is calculated from the voltage information.

In this embodiment, the left power supply unit 32 repeatedly acquires the remaining charge amount information about the left battery 31, and outputs the acquired remaining charge amount information to the left control circuit 33. The left control circuit 33 repeatedly transmits the controller information including the operation information and the remaining charge amount information to the main device 2.

The main device 2 transmits instruction information to the left controller 3. In this embodiment, the instruction information, which indicates an instruction to the left controller 3, includes information indicating whether or not the left battery 31 is to be charged. Note that the instruction information may be transmitted from the main device 2 to the left controller 3 with any suitable timing. For example, the instruction information is transmitted at the same intervals at which the controller information is transmitted (i.e., once per the above predetermined period of time), or at intervals different from those of the controller information.

In this embodiment, the main device 2 and the left controller 3 can perform wired communication through the above terminals, or wireless communication using the wireless communication units. Specifically, in the attached state, the main device 2 and the left controller 3 perform wired communication. Here, in the attached state, the main-device left connection/communication unit 26 of the main device 2 is electrically connected with the left wired communication unit 37 of the left controller 3 so that wired communication can be performed therebetween. Therefore, the left control circuit 33 transmits the controller information (in other words, the remaining charge amount information included in the controller information) to the main device 2 by wired communication through the left wired communication unit 37. The main-device control circuit 23 transmits the instruction information to the left controller 3 through the main-device left connection/communication unit 26. Thus, in the attached state, one of the main device 2 and the left controller 3 can transmit information to the other by wired communication (i.e., without using wireless communication).

In the detached state, the main device 2 and the left controller 3 perform wireless communication. Specifically, the left control circuit 33 transmits the controller information to the main device 2 by wireless communication through the left wireless communication unit 34 (in other words, the left control circuit 33 causes the left wireless communication unit 34 to transmit the controller information). The main-device control circuit 23 transmits the instruction information to the left controller 3 through the main-device wireless communication unit 24 (in other words, the main-device control circuit 23 causes the main-device wireless communication unit 24 to transmit the instruction information). Thus, in the detached state, one of the main device 2 and the left controller 3 can transmit information to the other by wireless communication.

Note that, in another non-limiting example embodiment, the main device 2 and the controllers may perform communication wirelessly no matter whether they are in the attached state or in the detached state. In other words, the main device 2 and the controllers may perform wireless communication at least in the detached state, and may also perform wireless communication in the attached state. In still another non-limiting example embodiment, the controllers may be used only in the attached state. In other words, the controllers may not have the function of wirelessly communicating with the main device 2.

The main device 2 notifies the user of the amount of charge remaining in each of the batteries 31 and 41 of the controllers 3 and 4. For example, the main device 2 may display, on the display 5, information indicating the amount of charge remaining in each of the batteries 31 and 41. In this embodiment, the main device 2 can acquire the remaining charge amount information in both the attached state and the detached state, and therefore, in both of the two states, can notify the user of the amount of remaining charge.

(3-2. Operations Involved with Power Supply)

As described above, in this embodiment, the main device 2 and the controllers are each provided with a battery. Therefore, the main device 2 and the controllers can each be driven by power from their own built-in batteries. Here, in this embodiment, the main device 2 supplies power to the controllers under a predetermined condition so that the duration in which the information processing system 1 can be used is extended. As a result, the duration in which the controllers can be used can be extended, and therefore, the duration in which the information processing system 1 can be used can be extended. An overview of operations involved with power supply will now be described.

Figure 4:
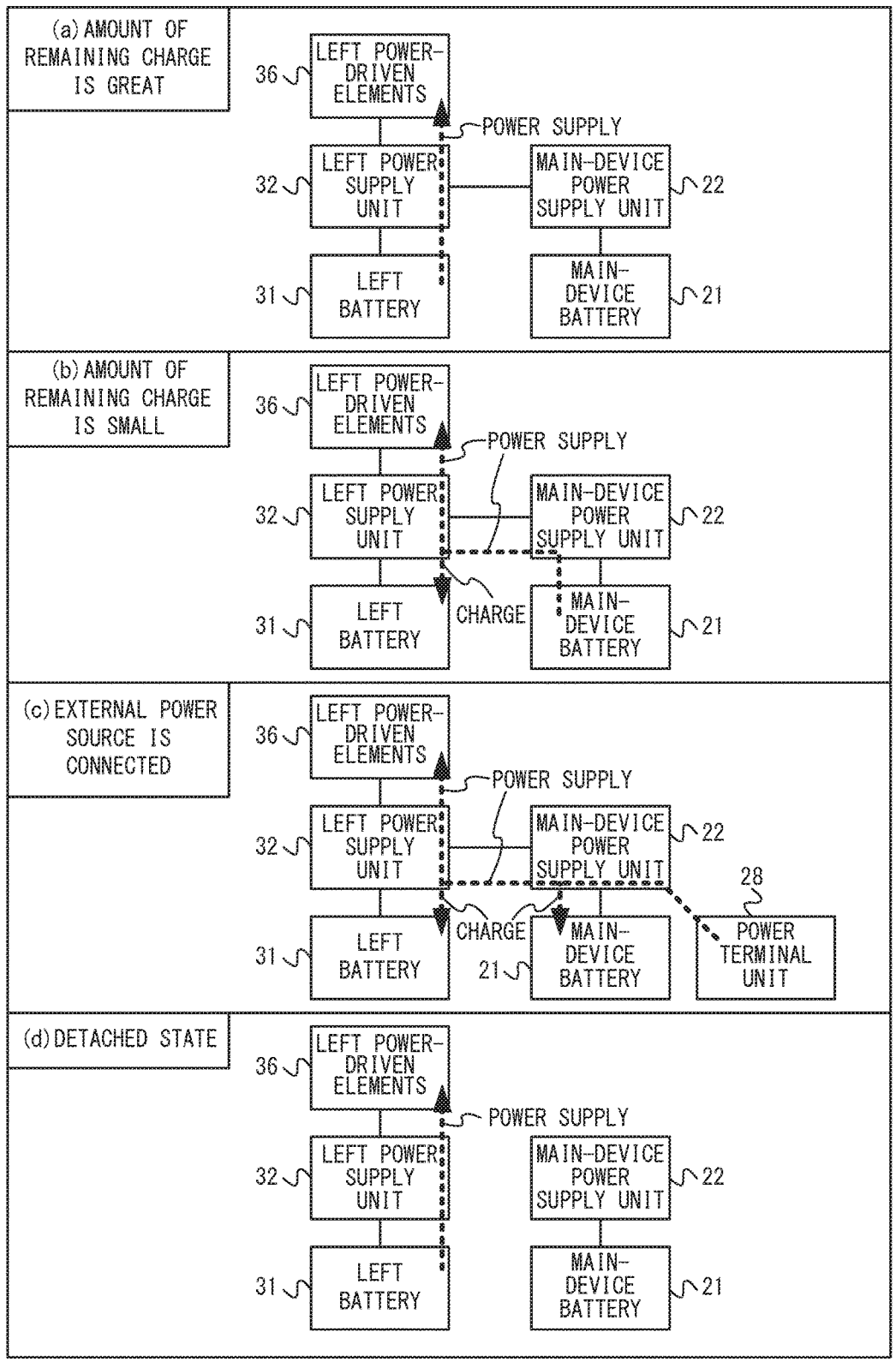
FIG. 4 is a diagram showing example non-limiting ways of supplying power to elements of a left controller to be supplied with power.

FIG. 4 is a diagram showing example non-limiting ways of supplying power to the left-controller power-driven elements. In this embodiment, the information processing system 1 determines the way of supplying power to the left power-driven elements 36, depending on which of modes (a)-(d) shown in FIG. 4 the information processing system 1 is in. The way of supplying power in each of modes (a)-(d) shown in FIG. 4 will be described.

In mode (a) shown in FIG. 4, the main device 2 and the left controller 3 are in the attached state, the main device 2 is not supplied with power from an external power source, and the amount of charge remaining in the left battery 31 is sufficient. Here, it is determined whether or not the amount of charge remaining in the left battery 31 is sufficient, by a determination step of determining whether or not the amount of charge remaining in the left battery 31 is greater than or equal to a predetermined threshold value. Note that the main device 2 can determine the amount of charge remaining in the left battery 31 on the basis of the remaining charge amount information transmitted from the left controller 3. In this embodiment, as the predetermined threshold value used in the determination step, one of two different threshold values is used, depending on whether or not the left controller 3 is being supplied with power, as described in detail below.

In mode (a) shown in FIG. 4, the main-device power supply unit 22 does not supply power to the left controller 3. In this case, the left power supply unit 32 supplies power from the left battery 31 to the left power-driven elements 36 (indicated by a dashed arrow shown in a portion corresponding mode (a) of FIG. 4).

Note that, in all modes (a)-(d), the main-device power supply unit 22 supplies power to the main-device power-driven elements 25, although not shown in FIG. 4. In other words, in this embodiment, when the main-device power supply unit 22 is supplying power to the left controller 3, the main-device power supply unit 22 is supplying power to the main-device power-driven elements 25 as well as the left controller 3. Note that, in mode (a) shown in FIG. 4, the main-device power supply unit 22 supplies power from the main-device battery 21 to the main-device power-driven elements 25.

In mode (b) shown in FIG. 4, the main device 2 and the left controller 3 are in the attached state, the main device 2 is not supplied with power from an external power source, and the amount of charge remaining in the left battery 31 is not sufficient. Specifically, when the main device 2 and the left controller 3 are in the attached state, and the main device 2 is not supplied with power from an external power source, the main-device power supply unit 22 supplies power in mode (a) shown in FIG. 4 if the amount of charge remaining in the left battery 31 is sufficient, or in mode (b) shown in FIG. 4 if the amount of charge remaining in the left battery 31 is not sufficient.

In mode (b) shown in FIG. 4, the main-device power supply unit 22 supplies power from the main-device battery 21 to the left controller 3 (specifically, the left power-driven elements 36) (indicated by a dashed arrow shown in a portion corresponding mode (b) of FIG. 4). In other words, the left power supply unit 32 supplies power supplied from the main device 2 to the left power-driven elements 36. In addition, in mode (b) shown in FIG. 4, the main device 2 charges the left controller 3. Specifically, the left power supply unit 32 charges the left battery 31 with power supplied from the main device 2 (indicated by a dashed arrow shown in a portion corresponding to mode (b) of FIG. 4).

Note that, in mode (b) shown in FIG. 4, the main-device power supply unit 22 supplies power from the main-device battery 21 to the main-device power-driven elements 25, as in mode (a) of FIG. 4.

In mode (b) shown in FIG. 4, when the left battery 31 is charged, so that the amount of charge remaining in the left battery 31 is greater than or equal to a predetermined value, the main device 2 determines that the amount of charge remaining in the left battery 31 is sufficient, as described in detail below. As a result, the information processing system 1 is changed from mode (b) to mode (a) shown in FIG. 4, in which the charging of the left battery 31 is stopped.

As described above in relation to modes (a) and (b) shown in FIG. 4, in this embodiment, the main-device power supply unit 22 supplies power from the main-device battery 21 to the left controller 3 under a predetermined condition about the amount of remaining charge which is indicated by the remaining charge amount information received from the left controller 3 (specifically, the amount of remaining charge is smaller than the predetermined threshold value). When the main device 2 supplies power to the left controller 3, the left power supply unit 32 supplies power supplied from the main device 2 to the left power-driven elements 36 (including the left control circuit 33) instead of power from the left battery 31.

As described above, the main device 2 does not always supply power to the left controller 3 when the left controller 3 is in the attached state, and supplies power under a predetermined condition about the amount of charge remaining in the left battery 31. Therefore, the power of the main-device battery 21 can be efficiently used. As a result, the duration in which the information processing system 1 can be used can be extended. When the predetermined condition is satisfied, the main device 2 supplies power to the left controller 3. Therefore, the occurrence of the situation where the battery of the left controller 3 is dead can be reduced. In addition, when the amount of charge remaining in the left battery 31 is zero, the user can charge the left battery 31 by attaching the left controller 3 to the main device 2. In other words, even when the amount of charge remaining in the left battery 31 is zero, the user can use the left controller 3 to operate the main device 2 by attaching the left controller 3 to the main device 2.

In mode (c) shown in FIG. 4, the main device 2 and the left controller 3 are in attached state, and the main device 2 is being supplied with power from an external power source. In mode (c) shown in FIG. 4, the main device 2 is being supplied with power from an external power source, i.e. external power is being supplied to the main device 2 through the power terminal unit 28.

In mode (c) shown in FIG. 4, the main-device power supply unit 22 supplies external power from the power terminal unit 28 to the left controller 3 (indicated by a dashed arrow shown in a portion corresponding to mode (c) of FIG. 4). In this case, as in mode (b) shown in FIG. 4, the left power supply unit 32 supplies power supplied from the main device 2 to the left power-driven elements 36, and at the same time, charges the left battery 31 with power supplied from the main device 2 (indicated by dashed arrows shown in the portion corresponding to mode (b) of FIG. 4).

Also, in this case, the main-device power supply unit 22 supplies external power from the power terminal unit 28 to the main-device power-driven elements 25 (not shown), and at the same time, charges the main-device battery 21 with external power from the power terminal unit 28 (indicated by a dashed arrow shown in the portion corresponding to mode (c) of FIG. 4). Note that, in another non-limiting example embodiment, the main-device power supply unit 22 may not charge the main-device battery 21 when the amount of charge remaining in the main-device battery 21 is greater than or equal to a predetermined value.

Note that, in mode (c) shown in FIG. 4, the main-device power supply unit 22 charges the main-device battery 21 until the main-device battery 21 reaches a full charge (i.e., the amount of remaining charge is 100%). The left power supply unit 32 charges the left battery 31 until the amount of charge remaining in the left battery 31 is 100%. Therefore, in mode (c) shown in FIG. 4, the information processing system 1 can sufficiently charge the batteries 21 and 31.

As described above in relation to mode (c) shown in FIG. 4, in this embodiment, the main-device power supply unit 22, when supplied with power from a power source external to the main device 2 through the power terminal unit 28, supplies power supplied from the power source external to the main device 2 to the main-device power-driven elements 25. As a result, when external power is being supplied, the information processing system 1 can operate without consuming the power of the batteries. Alternatively, the main-device power supply unit 22 may supply power supplied from a power source external to the main device 2 to the left controller 3, regardless of the amount of remaining charge indicated by the remaining charge amount information.

As described above in relation to modes (a)-(c) and the like, in the attached state, the left controller 3 transmits the remaining charge amount information to the main device 2 through the left wired communication unit 37. In the attached state, when the main-device power supply unit 22 determines to supply power to the left controller 3, the main-device power supply unit 22 supplies power from the main-device battery 21 to the left controller 3 through the main-device left connection/communication unit 26 (mode (a) shown in FIG. 4). As a result, the remaining charge amount information can be exchanged between the main device 2 and the left controller 3 by wired communication through terminals, and in addition, power can be exchanged therebetween through the terminals.

In mode (d) shown in FIG. 4, the main device 2 and the left controller 3 are in the detached state (i.e., the left controller 3 wirelessly communicates with the main device 2). In the detached state, the main device 2 is not connected with the left controller 3 via a wire, and therefore, the main-device power supply unit 22 does not supply power to the left controller 3 (see a portion corresponding to mode (d) of FIG. 4). Therefore, when the left controller 3 is wirelessly communicating with the main device 2, the left power supply unit 32 supplies power from the left battery 31 to the left power-driven elements 36 (indicated by a dashed arrow shown in the portion corresponding to mode (d) of FIG. 4). As a result, the left controller 3 can operate even in the detached state.

Next, a step of determining whether or not the main device 2 is to supply power to the left controller 3 (i.e., whether or not the amount of charge remaining in the left battery 31 is sufficient, or in other words, whether to perform the operation of mode (a) shown in FIG. 4 or the operation of mode (b) shown in FIG. 4) will be described with reference to FIG. 5.

In this embodiment, if the amount of charge remaining in the left battery 31 is greater than or equal to a threshold value, the main device 2 determines not to supply power to the left controller 3. Meanwhile, if the amount of charge remaining in the left battery 31 is smaller than the threshold value, the main device 2 determines to supply power to the left controller 3. Here, in this embodiment, the determination of whether or not to supply to the left controller 3 is based on a first threshold value and a second threshold value smaller than the first threshold value. The determination step will now be described in greater detail with reference to FIG. 5, which shows a non-limiting example.

Figure 5:
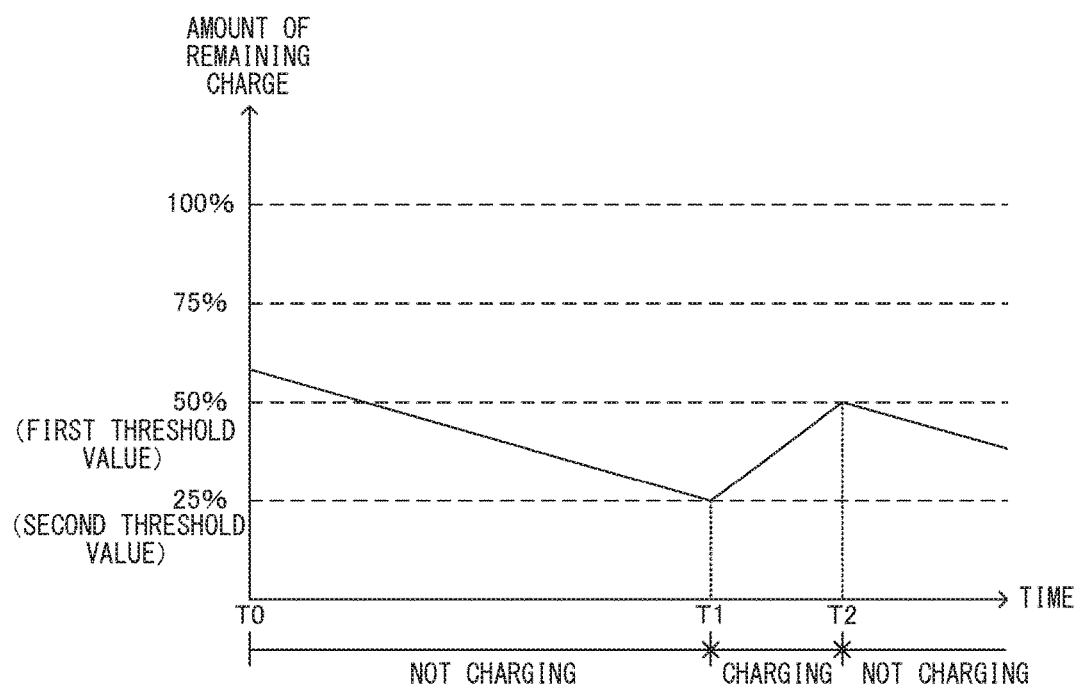
FIG. 5 is a diagram showing example non-limiting changes with time in the amount of charge remaining in a left battery coupled to an example non-limiting main device.

FIG. 5 is a diagram showing example non-limiting changes with time in the amount of charge remaining in the left battery 31 coupled to the main device 2. The main device 2 initially performs the determination using the first threshold value at a time point T0 when the left controller 3 is attached to the main device 2 (referred to as "the attachment time point"). Specifically, the main-device control circuit 23, when detecting the attachment of the left controller 3 to the main device 2, determines whether or not the amount of remaining charge indicated by the remaining charge amount information from the left controller 3 is greater than or equal to the first threshold value. If the amount of remaining charge indicated by the remaining charge amount information from the left controller 3 is greater than or equal to the first threshold value, the main-device control circuit 23 determines not to supply power to the left controller 3. If the amount of remaining charge indicated by the remaining charge amount information from the left controller 3 is smaller than the first threshold value, the main-device control circuit 23 determines to supply power to the left controller 3. Note that it is here assumed that the amount of charge remaining in the battery is expressed in percentage terms, and the first threshold value is 50%.

Note that, in another non-limiting example embodiment, in the determination step at the time of the attachment, the second threshold value, or a threshold value which is different from the first and second threshold values (e.g., a value which is smaller than the first threshold value and greater than the second threshold value), may be used.

In the example of FIG. 5, at the attachment time point T0, the amount of charge remaining in the left battery 31 is greater than or equal to the first threshold value (i.e., 50%), and therefore, the main-device control circuit 23 determines not to supply power. In this case, the main-device control circuit 23 causes the main-device power supply unit 22 to operate in mode (a) shown in FIG. 4. In this case, the left power-driven elements 36 are driven by power from the left battery 31, and therefore, the amount of charge remaining in the left battery 31 decreases with time (see FIG. 5). Meanwhile, if the amount of charge remaining in the left battery 31 is smaller than the first threshold value at the attachment time point T0, the main-device control circuit 23 determines to supply power, although not shown. In this case, the main-device control circuit 23 causes the main-device power supply unit 22 to operate in mode (b) shown in FIG. 4.

After the determination step at the attachment time point T0, if the main device 2 is in the attached state and is not supplied with power from an external power source, the determination step is performed at a rate of once per predetermined period of time. The determination step is, for example, performed each time the controller information is acquired from the left controller 3. Here, after the attachment time point T0, the main-device control circuit 23 performs the determination step using the first threshold value when power is being supplied to the left controller 3, and the second threshold value when power is not being supplied to the left controller 3. In the example of FIG. 5, since power supply is not being performed at the attachment time point T0, the determination step is performed using the second threshold value immediately after the attachment time point T0. Note that it is here assumed that the second threshold value is 25%, which is smaller than the first threshold value. Therefore, as in the example shown in FIG. 5, when power is not being supplied, then if the amount of charge remaining in the left battery 31 is smaller than the first threshold value, but greater than or equal to the second threshold value, power is not supplied to the left controller 3.

When the amount of charge remaining in the left battery 31 becomes smaller than the second threshold value at a time point T1 shown in FIG. 5, the main-device control circuit 23 determines to supply power to the left controller 3. As a result, power starts to be supplied from the main device 2 to the left controller 3, so that the left battery 31 is charged (see the portion corresponding to mode (b) of FIG. 4). Therefore, after the time point T1, the amount of charge remaining in the left battery 31 increases with time (see FIG. 5).

As described above, when power is being supplied to the left controller 3, the main-device control circuit 23 performs the determination step using the first threshold value. Therefore, after the time point T1, even when the amount of charge remaining in the left battery 31 is greater than or equal to the second threshold value, but smaller than the first threshold value, the main-device control circuit 23 determines to supply power to the left controller 3. As a result, the main-device power supply unit 22 continues to supply power to the left controller 3, and therefore, the amount of charge remaining in the left battery 31 increases (see FIG. 5).

When the amount of charge remaining in the left battery 31 becomes greater than or equal to the first threshold value at a time point T2, the main-device control circuit 23 determines not to supply power to the left controller 3. As a result, the main device 2 stops supplying power to the left controller 3. Therefore, after the time point T2, the amount of charge remaining in the left battery 31 decreases with time (see FIG. 5).

In the example of FIG. 5, after the time point T2, the main device 2 repeatedly performs an operation of starting supplying power to the left controller 3 when the amount of charge remaining in the left battery 31 becomes smaller than the second threshold value, and an operation of stopping supplying power to the left controller 3 when the amount of charge remaining in the left battery 31 becomes greater than or equal to the first threshold value. Therefore, in this embodiment, in the attached state, the amount of charge remaining in the left battery 31 is maintained greater than or equal to the second threshold value (here 25%).

As described above, in this embodiment, when power is being supplied from the left battery 31 to the left control circuit 33, then if the main device 2 starts supplying power to the left controller 3 (the time point T1 shown in FIG. 5), the left power supply unit 32 stops supplying power from the left battery 31 to the left control circuit 33, and starts supplying power supplied from the main device 2 to the left control circuit 33. Therefore, in this embodiment, the left controller 3 can inhibit power consumption of its own left battery 31 when power is supplied from the main device 2.

As described above, in this embodiment, when the main-device power supply unit 22 is supplying power to the left controller 3, then if the amount of remaining charge indicated by the remaining charge amount information transmitted from the left controller 3 becomes greater than or equal to the first threshold value, the main-device power supply unit 22 stops supplying power to the left controller 3 (the time point T2 shown in FIG. 5). When the main-device power supply unit 22 is not supplying power to the left controller 3, then if the amount of remaining charge indicated by the remaining charge amount information transmitted from the left controller 3 becomes smaller than the second threshold value, the main-device power supply unit 22 starts supplying power to the left controller 3 (the time point T1 shown in FIG. 5).

Note that if only one threshold value is used in the determination step, power supply is started when the amount of charge remaining in the left battery 31 becomes smaller than the threshold value, and power supply is stopped when the amount of charge remaining in the left battery 31 becomes greater than or equal to the threshold value. Therefore, the starting and stopping of power supply are frequently repeated. In contrast to this, in this embodiment, the two threshold values are used, and therefore, the frequency of repetition of the starting and stopping of power supply can be reduced. Note that, in another non-limiting example embodiment, the main device 2 may use only one threshold value in the determination step.

In this embodiment, the main device 2 determines whether or not to supply power to the left controller 3 on the basis of the determination step, regardless of the amount of charge remaining in the main-device battery 21. In other words, in this embodiment, even when the amount of charge remaining in the main-device battery 21 is small, the main device 2 may supply power to the left controller 3. In this embodiment, when the information processing system 1 continues to be used in the attached state, the amount of charge remaining in the main-device battery 21 reaches zero earlier than does the amount of charge remaining in each controller.

Here, if the amount of charge remaining in a controller reaches zero earlier than does the amount of charge remaining in the main-device battery 21, the controller can no longer be used in the detached state. In this case, while the main device 2 can operate, the controller cannot be used, and therefore, the user cannot use the information processing system 1. In contrast to this, when the amount of charge remaining in the main-device battery 21 reaches zero earlier than does the amount of charge remaining in the battery of each controller, the user can use the controllers in the detached state while the main device 2 is being charged (e.g., the main device 2 may be coupled to a display device, which is used to display an image, as described above). Thus, in this embodiment, the possibility that the amount of charge remaining in the battery of a controller reaches zero earlier is reduced, and therefore, even after the amount of charge remaining in the main-device battery 21 reaches zero, the controllers can be used, leading to an improvement in the convenience of the information processing system 1.

Note that, in the foregoing, a case where the main device 2 supplies power to the left controller 3 has been described by way of example. The main device 2 supplies power to the right controller 4 in a manner similar to that described above. Here, in this embodiment, the main device 2 controls power supply to the controllers 3 and 4 separately. In other words, the main device 2 determines whether or not to supply power to the right controller 4 no matter what state the left battery 31 is in (e.g., the attached state, or the state of charge of the left battery 31). Therefore, the main device 2 may not supply power to the right controller 4 while supplying power to the left controller 3.

Here, in this embodiment, the main-device power supply unit 22 supplies power from the main-device battery 21 to one or more of a plurality of controllers (two in this embodiment) attached to the main device 2 that have transmitted the remaining charge amount information satisfying a condition (i.e., the remaining charge amount information indicating that the amount of remaining charge is smaller than a threshold value). As a result, the main device 2 can control power supply to controllers separately, and therefore, each controller can be efficiently supplied with power.

[4. Specific Non-Limiting Example of Process in each Device]

(4-1. Specific Non-Limiting Example of Process in Main Device 2)

Figure 6:
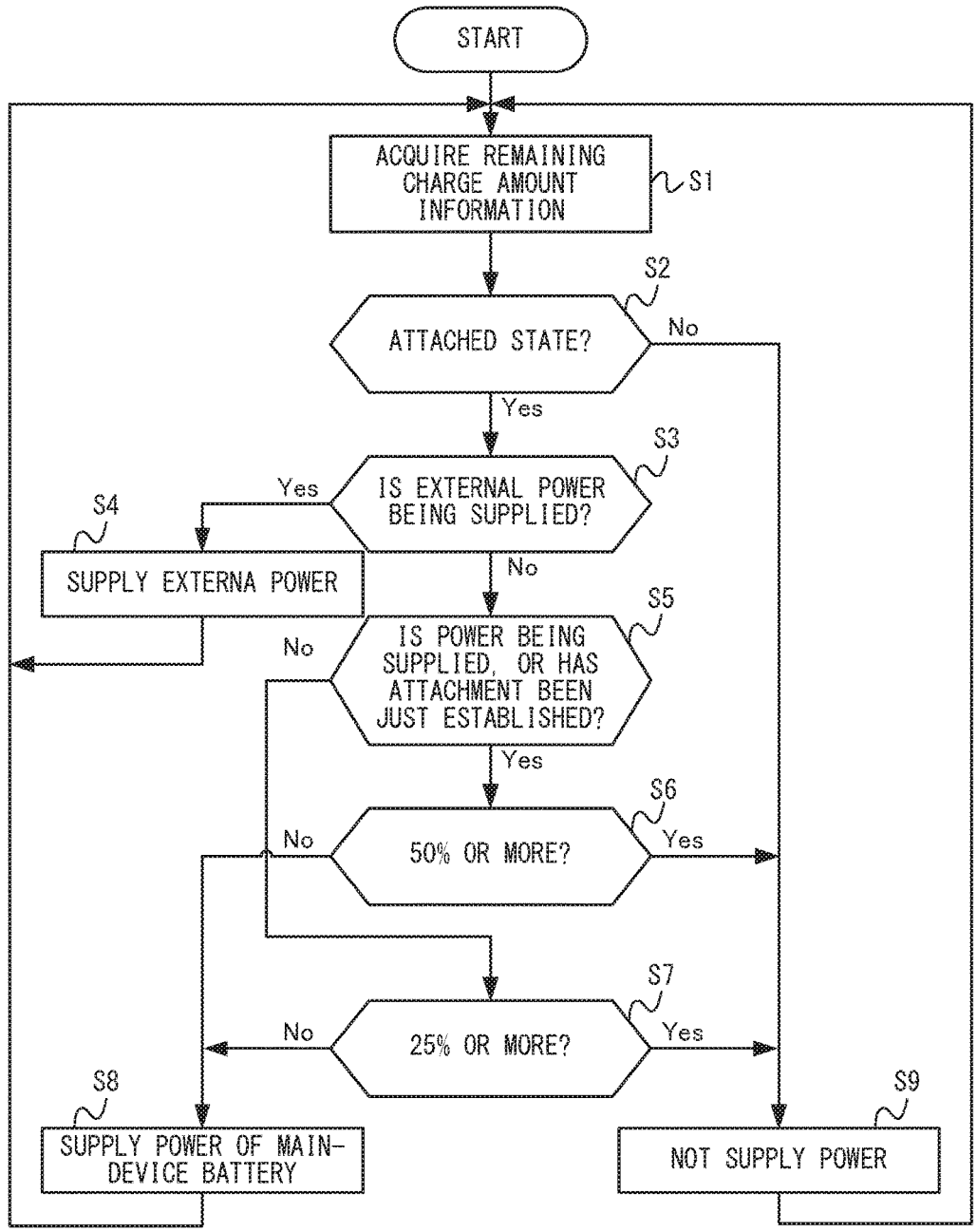
FIG. 6 is a flowchart showing an example non-limiting flow of a process executed in an example non-limiting main device.

FIG. 6 is a flowchart showing an example non-limiting flow of a process executed in the main device 2. Note that a series of steps shown in FIG. 6 is continually executed when the main device 2 is active. Specifically, the series of steps shown in FIG. 6 is started during activation of the main device 2. In this embodiment, the main device 2 operates in either an on mode or a sleep mode when it is active. In the on mode, for example, the main device 2 performs a normal operation. In the sleep mode, for example, the display may be off, or no application may be executed. In this embodiment, the series of steps is executed in each of the two modes. Note that, in another non-limiting example embodiment, the series of steps may not be executed in the sleep mode.

In this embodiment, a CPU included in the main-device control circuit 23 of the main device 2 executes each step shown in FIG. 6. Specifically, in this embodiment, the CPU executes each step shown in FIG. 6 by executing an information processing program stored in the main device 2. Note that, in another non-limiting example embodiment, a portion of the steps in the flowchart may be executed by a processor or a dedicated circuit (e.g., a circuit included in the main-device power supply unit 22) other than the CPU.

The steps in the flowchart shown in FIG. 6 are merely for illustrative purposes (the same is true of a flowchart shown in FIG. 7 described below). As long as a similar effect is achieved, the order in which the steps are executed may be changed, or another step may be executed in addition to (or instead of) each step.

In the flowchart shown in FIG. 6, shown is a process which is performed by the main device 2 with respect to the left controller 3. In this embodiment, the main device 2 executes a series of steps similar to those shown in FIG. 6 with respect to the right controller 4. Note that the series of steps (steps S1-S9) with respect to the left controller 3, and the series of steps with respect to the right controller 4, are executed in parallel.

The main device 2 stores, in a memory, various pieces of information (in other words, data) which are used in the series of steps shown in FIG. 6. For example, the memory stores the remaining charge amount information, the first threshold value information, the second threshold value information, and the power supply flag information. The first threshold value information indicates the first threshold value. The second threshold value information indicates the second threshold value. The power supply flag information indicates a flag which indicates whether or not the main device is supplying power to a controller. In this embodiment, the power supply flag information about the left controller 3 and the power supply flag information about the right controller 4 are stored in a memory. The main-device control circuit 23 (specifically, a CPU) executes each step shown in FIG. 6 using the memory. Specifically, the main-device control circuit 23 stores information obtained in each step into the memory, and reads and uses the information from the memory in a subsequent step if necessary.

In step S1 shown in FIG. 6, the main-device control circuit 23 acquires the remaining charge amount information from the left controller 3. Specifically, the main-device control circuit 23 receives the controller information from the left controller 3 through the main-device wireless communication unit 24 or the main-device left connection/communication unit 26. The main-device control circuit 23 stores, into the memory, the remaining charge amount information included in the controller information. Note that, in this embodiment, step S1 is repeatedly executed at a rate of once per predetermined period of time. The predetermined period of time may be the same as or different from time intervals at which the left controller 3 transmits the controller information. Following step S1, step S2 is executed.

In step S2, the main-device control circuit 23 determines whether or not the main device 2 and the left controller 3 are in the attached state. The determination in step S2 may be specifically achieved in any suitable manner. For example, the main-device control circuit 23 performs the determination on the basis of a signal state (e.g., a voltage state) at a predetermined terminal included in the main-device left connection/communication unit 26. If the determination result in step S2 is positive, step S3 is executed. Meanwhile, if the determination result in step S2 is negative, step S9 is executed.

In step S3, the main-device control circuit 23 determines whether or not the main device 2 is being supplied with power from an external power source. Specifically, the main-device control circuit 23 determines whether or not power is being supplied from an external power source through the power terminal unit 28. If the determination result in step S3 is positive, step S4 is executed. Meanwhile, if the determination result in step S3 is negative, step S5 is executed.

In step S4, the main-device control circuit 23 supplies external power to the left controller 3. Specifically, the main-device control circuit 23 outputs a control instruction to the main-device power supply unit 22 to supply external power from the power terminal unit 28 to the left controller 3. Note that if external power has already been being supplied to the left controller 3 at step S4, the main-device control circuit 23 may not output the control instruction again. The main-device control circuit 23 also transmits instruction information indicating an instruction to charge the left battery 31, to the left controller 3 through the main-device left connection/communication unit 26.

Furthermore, in step S4, the main-device control circuit 23 supplies external power from the power terminal unit 28 to the main-device power-driven elements 25, and controls the main-device power supply unit 22 so that the main-device battery 21 is charged using external power from the power terminal unit 28. Thus, the operation of mode (c) shown in FIG. 4 is performed by step S4. Following step S4, step S1 is executed again.

In step S5, the main-device control circuit 23 determines whether or not either "the left controller 3 has been just attached to the main device 2 (in other words, it is immediately after the attachment)" or "the left controller 3 is being supplied with power." Here, it can be determined whether or not the left controller 3 has been just attached to the main device 2, by determining whether or not the determination result in step S2 has just changed from negative to positive, for example. It can be determined whether or not the left controller 3 is being supplied with power, by referring to the power supply flag information stored in the memory. If the determination result in step S5 is positive, step S6 is executed. Meanwhile, if the determination result in step S5 is negative, step S7 is executed.

In step S6, the main-device control circuit 23 determines whether or not the amount of charge remaining in the left battery 31 is sufficient, using the first threshold value. Specifically, the main-device control circuit 23 determines whether or not the amount of charge remaining in the left battery 31 which is indicated by the remaining charge amount information acquired in step S1 is greater than or equal to 50%. If the determination result in step S6 is positive, step S9 is executed. Meanwhile, if the determination result in step S6 is negative, step S8 is executed.

Meanwhile, in step S7, it is determined whether or not the amount of charge remaining in the left battery 31 is sufficient, using the second threshold value. Specifically, the main-device control circuit 23 determines whether or not the amount of charge remaining in the left battery 31 which is indicated by the remaining charge amount information acquired in step S1 is greater than or equal to 25%. If the determination result in step S7 is positive, step S9 is executed. Meanwhile, if the determination result in step S7 is negative, step S8 is executed.

In step S8, the main-device control circuit 23 supplies power from the main-device battery 21 to the left controller 3. Specifically, the main-device control circuit 23 outputs a control instruction to the main-device power supply unit 22 to supply power from the main-device battery 21 to the left controller 3. The main-device control circuit 23 also stores, into the memory, the power supply flag information indicating that power is being supplied to the left controller 3. Note that, at the time of step S8, if power is being supplied from the main-device battery 21 to the left controller 3, the main-device control circuit 23 may not output the control instruction again, and may not store the power supply flag information into the memory again. The main-device control circuit 23 also transmits instruction information indicating an instruction to charge the left battery 31, to the left controller 3 through the main-device left connection/communication unit 26.

Furthermore, in step S8, the main-device control circuit 23 controls the main-device power supply unit 22 so that power is supplied from the main-device battery 21 to the main-device power-driven elements 25. By step S8, the operation of mode (b) shown in FIG. 4 is performed. Following step S8, step S1 is executed again.

Meanwhile, in step S9, the main-device control circuit 23 supplies power to the main-device power-driven elements 25, but not to the left controller 3. Specifically, the main-device control circuit 23 controls the main-device power supply unit 22 so that power is supplied from the main-device battery 21 to the main-device power-driven elements 25. The main-device control circuit 23 also stores, into the memory, the power supply flag information indicating that power is not being supplied to the left controller 3. Note that, at the time of step S9, if power is not being supplied from the main-device battery 21 to the left controller 3, the main-device control circuit 23 may not store the power supply flag information into the memory. The main-device control circuit 23 also transmits instruction information indicating an instruction not to charge the left battery 31, to the left controller 3 through the main-device left connection/communication unit 26. By step S9, the operation of mode (a) or (d) shown in FIG. 4 is performed. Following step S9, step S1 is executed again.

(4-2. Specific Example Non-Limiting Process of Left Controller 3)

Figure 7:
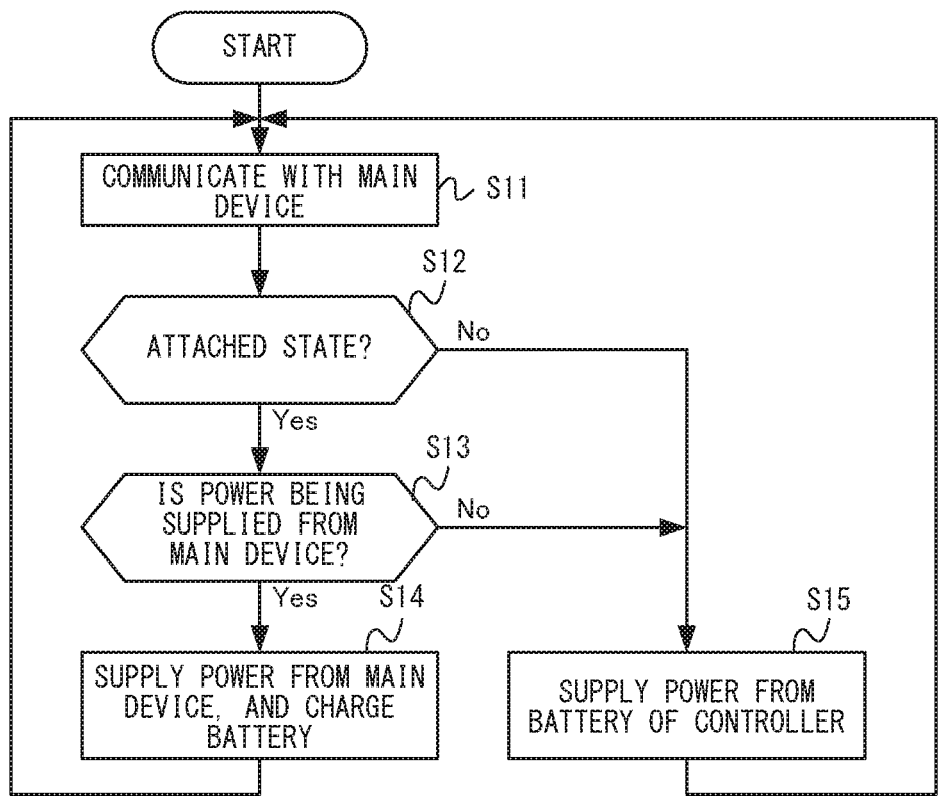
FIG. 7 is a flowchart showing an example non-limiting flow of a process executed in an example non-limiting left controller.

FIG. 7 is a flowchart showing an example non-limiting flow of a process executed in the left controller 3. Note that a series of steps shown in FIG. 7 is continually executed when the left controller 3 is active (specifically, when power is being supplied to the left power-driven elements 36, or when the left controller 3 is on).

In this embodiment, the left control circuit 33 of the left controller 3 executes each step shown in FIG. 7. Note that, in another non-limiting example embodiment, a portion of the steps in the flowchart may be executed by another processing circuit (e.g., a circuit included in the left power supply unit 32) instead of the left control circuit 33.

In the flowchart shown in FIG. 7, a series of steps executed by the left controller 3 is shown. Note that, in this embodiment, the right controller 4 executes a series of steps similar to those shown in FIG. 7.

The left controller 3 stores, in its own built-in memory, various pieces of information (in other words, data) for use in the series of steps shown in FIG. 7. The left control circuit 33 executes each step shown in FIG. 7 using the memory. Specifically, the left control circuit 33 stores information obtained in each step into the memory, and reads and uses the information from the memory in a subsequent step if necessary.

In step S11 shown in FIG. 7, the left control circuit 33 communicates with the main device 2. Specifically, the left control circuit 33 transmits the controller information to the main device 2 through the left wireless communication unit 34 or the left wired communication unit 37. The left control circuit 33 receives the instruction information from the main device 2 through the left wireless communication unit 34 or the left wired communication unit 37. Note that, in this embodiment, step S11 is repeatedly executed at a rate of once per predetermined period of time. Following step S11, step S12 is executed.

In step S12, the left control circuit 33 determines whether or not the main device 2 and the left controller 3 are in the attached state. The determination in step S12 may be specifically achieved in any suitable manner. For example, the left control circuit 33 performs the determination on the basis of a signal state (e.g., a voltage state) at a predetermined terminal included in the left wired communication unit 37. If the determination result in step S12 is positive, step S13 is executed. Meanwhile, if the determination result in step S12 is negative, step S15 is executed.

In step S13, the left control circuit 33 determines whether or not power is being supplied from the main device 2 through the left wired communication unit 37. The determination in step S13 may be specifically achieved in any suitable manner. For example, the left control circuit 33 may perform the determination on the basis of whether or not the instruction information transmitted from the main device 2 indicates an instruction to charge the left battery 31, or on the basis of the voltage state of the power terminal included in the left wired communication unit 37. If the determination result in step S13 is positive, step S14 is executed. Meanwhile, if the determination result in step S13 is negative, step S15 is executed.

In step S14, the left control circuit 33 supplies power from the main device 2 to the left power-driven elements 36, and charges the left battery 31 with power from the main device 2. Specifically, the left control circuit 33 controls the left power supply unit 32 so that power is supplied from the main device 2 to the left power-driven elements 36, and at the same time, the left battery 31 is charged with power from the main device 2 (modes (b) and (c) shown in FIG. 4). Following step S14, step S11 is executed again.

Meanwhile, in step S15, the left control circuit 33 supplies power from the left battery 31 to the left power-driven elements 36. Specifically, the left control circuit 33 controls the left power supply unit 32 so that power is supplied from the left battery 31 to the left power-driven elements 36 (modes (a) or (d) shown in FIG. 4). Following step S15, step S11 is executed again.

[5. Non-Limiting Example Variations]

(Non-Limiting Example Variation of Charging of Battery of Controller)

In the above embodiments, the power supply unit (specifically, the left power supply unit 32 or the right power supply unit 42) of each of the controllers 3 and 4, when the controller is supplied with power from the main device 2, supplies power supplied from the main device 2 to the control circuit (specifically, the left control circuit 33 or the right control circuit 43), and at the same time, charges the battery (specifically, the left battery 31 or the right battery 41) with power supplied from the main device 2.

Here, in another non-limiting example embodiment, the power supply unit of each of the controllers 3 and 4, when the controller is supplied with power from the main device 2, may supply the supplied power to the control circuit, and at the same time, may not charge the battery. In other words, the main device 2, when supplying power to a controller, may supply power to elements of the controller which are to be supplied with power, and at the same time, may not charge the battery of the controller. Note that, in this embodiment, the main device 2, when supplying power to a controller, can supply power only to elements to be supplied with power by transmitting, to the controller, the instruction information indicating an instruction not to charge the battery of the controller.

For example, in a non-limiting example variation of this embodiment, when power is not being supplied to a controller, then if the amount of charge remaining in the controller is smaller than a predetermined threshold value, the main device 2 may supply power only to elements of the controller which are to be supplied with power (i.e., may not charge the battery). As a result, the rate of decrease of the amount of charge remaining in the main-device battery 21 of the main device 2 can be reduced, and therefore, the duration in which the main device 2 can be used can be extended. Note that the predetermined threshold value in this variation may be, for example, the first threshold value or the second threshold value. The main device 2 may use a single threshold value.

In this variation, for example, when a controller is attached to the main device 2, then if the amount of charge remaining in the battery of the controller is smaller than the predetermined threshold value, power may be supplied to elements of the controller which are to be supplied with power, and the battery of the controller may be charged. Thus, when a predetermined first condition is satisfied, the main device 2 may supply power to elements of the controller which are to be supplied with power, and charge the battery of the controller. When a predetermined second condition is satisfied, the main device 2 may only supply power to elements of the controller which are to be supplied with power. Note that the first and second conditions are, for example, a condition about the amount of charge remaining in a controller, a condition about the state of power supply from the main device 2 to a controller (e.g., whether or not power is being supplied), and/or the attached state of the main device 2 and a controller (e.g., whether or not the main device 2 and the controller have been just attached together).

(Non-Limiting Example Variation of Power Supply to Controller)

In a non-limiting example variation of this embodiment, when the amount of charge remaining in the main-device battery 21 becomes small, the main device 2 may stop supplying power to the controllers. Specifically, when the amount of charge remaining in the main-device battery 21 becomes smaller than or equal to a predetermined value (e.g., 25% or less), the main-device power supply unit 22 may stop supplying power from the main-device battery 21 to the controllers, regardless of the amount of remaining charge indicated by the remaining charge amount information transmitted from the controllers. As a result, a decrease in the amount of charge remaining in the main-device battery 21 of the main device 2 can be reduced, and therefore, the duration in which the main device 2 can be used can be extended.

In another non-limiting example embodiment, a variation in which power is supplied only to elements of a controller which are to be supplied with power (see the above section "(Non-Limiting Example Variation of Charging of Battery of Controller)"), and a variation in which power supply to the controllers is stopped when the amount of charge remaining in the main-device battery 21 is small (see the above section "(Non-Limiting Example Variation of Power Supply to Controller)"), may be combined together.

In a non-limiting example variation of this embodiment, the main device 2 may start supplying power to a controller in response to the attachment of the controller to the main device 2. In this case, after the attachment time point, the main device 2 may stop supplying power to the controller under a predetermined condition (e.g., when the amount of charge remaining in the controller is greater than or equal to a predetermined value), or may continue to supply power to the controller as long as the controller is in the attached state. In this variation, the controller may only supply power supplied from the main device 2 to elements of the controller which are to be supplied with power, or may supply power to elements of the controller which are to be supplied with power, and charge the battery.

Thus, in the above embodiments and variations, if at least a condition that the main device 2 is allowed to perform wired communication with a controller (in other words, the main device 2 is connected with the controller by wired communication, or are in the attached state) is satisfied, the main-device power supply unit 22 supplies power from the main-device battery 21 to the controller which is allowed to perform wired communication with the main device 2 (in other words, the controller is connected with the main device 2 by wired communication). When the main device 2 and a controller are not allowed to perform wired communication with each other (in other words, the main device 2 and the controller are not connected together by wired communication, or are in the detached state), the power supply units 32 and 42 of the controllers 3 and 4 supply power from the batteries 31 and 41 of the controllers 3 and 4 to the control circuits 33 and 43, respectively. Thus, the controllers can be used in the detached state from the main device 2, and the batteries of the controllers can be charged by being attached to the main device 2, and therefore, the user can use the controller while the controllers are being charged. As a result, the convenience of the controllers can be improved.

(Other Non-limiting Example Variations)

In the above embodiments, the main-device control circuit 23 executes a game process on the basis of operations performed on the operation unit (the left operation unit 35 and/or the right operation unit 45). In other words, in the above embodiments, the information processing system 1 functions as a game device (or a game system). Here, in another non-limiting example embodiment, the information processing system 1 may be, for example, any information processing devices such as a tablet terminal, smartphone, mobile telephone, and the like, in addition to a game device.

In another non-limiting example embodiment, when the main device 2 can communicate with a server via a network, such as the Internet or the like, the process operations of the main device 2 and/or the controllers may be changed by the main device 2 receiving an update instruction from the server. For example, according to an update instruction from the server, the main device 2 may change (a) the threshold value, (b) whether or not the battery of a controller is to be charged when power is supplied to the controller, or (c) whether or not power is to be supplied to a controller when the amount of charge remaining in the main-device battery 21 is small.

A portion of the steps which are executed in the main device 2 in the above embodiments may be executed in the controllers. A portion of the steps which are executed in the controllers in the above embodiments may be executed in the main device 2. For example, in another non-limiting example embodiment, the controllers may execute the determination steps using the threshold values (i.e., the determination steps in steps S6 and S7), and transmit the determination results to the main device 2. For example, when power is supplied from the main device 2 to a controller, the controller may determine whether or not the battery of the controller is to be charged.

The above embodiments may be applied to a mobile information processing device (or information processing system), game device (or game system), and the like, in order to improve the convenience of an operation device, for example.

While certain example systems, methods, devices and apparatuses have been described herein, it is to be understood that the appended claims are not to be limited to the systems, methods, devices and apparatuses disclosed, but on the contrary, are intended to cover various modifications and equivalent arrangements included within the spirit and scope of the appended claims.

What is claimed is:

1. An information processing system comprising:
   an information processing device; and
   a first operation device configured for selective attachment to/detachment from the information processing device,
   wherein
   the first operation device includes
      a first control circuit configured to control at least a portion of the first operation device,
      a first battery,
      a first power supply circuit configured to control power supply to the first control circuit, and
      a first communication circuit, wherein the first control circuit is configured to control the first communication circuit to transmit, to the information processing device, first remaining charge amount information indicating an amount of charge remaining in the first battery,
   the information processing device includes
      a second control circuit configured to control at least a portion of the information processing device,
      a second battery, and
      a second power supply circuit configured to control power supply to the second control circuit,
   wherein the second power supply circuit is configured to supply power from the second battery to the first operation device based on the amount of remaining charge indicated by the first remaining charge amount information transmitted from the first operation device satisfying a condition, and
   wherein the first power supply circuit is configured to, based on power being supplied from the information processing device to the first operation device, supply the power supplied from the information processing device, but not power from the first battery, to the first control circuit.

2. The information processing system according to claim 1, wherein
   the first operation device further includes a control,
   the first communication circuit includes a first communication interface configured to perform wired communication with the information processing device,
   the information processing device further includes a second communication interface configured to perform wired communication with the first operation device,
   the first communication circuit is configured to transmit, to the information processing device, by wired communication via the first communication interface, operation information based on an operation performed on the control, and the first remaining charge amount information, and
   the second power supply circuit is configured to supply the power from the second battery to the first operation device through the second communication interface.

3. The information processing system according to claim 2, wherein
the second control circuit is configured to perform an information process based on the operation information transmitted from the first communication circuit.

4. The information processing system according to claim 1, wherein
the first operation device further includes a control,
the first communication circuit includes a wireless communication interface configured to perform wireless communication with the information processing device,
the information processing device further includes a wireless communication interface configured to perform wireless communication with the first operation device, and
the first communication circuit is configured to transmit, to the main device, via the wireless communication interface of the first communication circuit, operation information indicating an operation performed on the control, and the first remaining charge amount information.

5. The information processing system according to claim 4, wherein
the second control circuit is configured to perform an information process based on the operation information transmitted from the first communication circuit.

6. The information processing system according to claim 4, wherein
the first power supply circuit is configured to, based on the first operation device performing wireless communication with the main device, supply power from the first battery to the first control circuit.

7. The information processing system according to claim 5, wherein
the first power supply circuit is configured to, based on the first operation device performing wireless communication with the information processing device, even if the remaining charge condition is satisfied, supply power from the first battery to the first control circuit.

8. The information processing system according to claim 1, wherein
the information processing device further includes a power terminal configured to acquire power supplied from a power source external to the main device, and
the second power supply circuit is configured to, based on the second power supply circuit being supplied with power from the external power source through the power terminal, supply power supplied from the power source to the second control circuit and to the first operation device.

9. The information processing system according to claim 1, wherein
the first power supply circuit is configured to, based on detecting power being supplied from the information processing device to the first operation device when the first power supply circuit is supplying power from the first battery to the first control circuit, stop supplying the power from the first battery to the first control circuit, and start to supply the power from the information processing device to the first control circuit.

10. The information processing system according to claim 1, wherein
the first power supply circuit is configured to, based on power being supplied from the information processing device to the first operation device, supply power from the information processing device to the first control circuit, and charge the first battery using power from the information processing device.

11. The information processing system according to claim 10, wherein
the second power supply circuit is configured to, based on the amount of remaining charge indicated by the first remaining charge amount information being equal to or greater than a first value when the second power supply circuit is supplying power to the first operation device, stop supplying power to the first operation device, and
the second power supply circuit is configured to, based on the amount of remaining charge indicated by the first remaining charge amount information being smaller than the first value when the second power supply circuit is not supplying power to the first operation device, start supplying power to the first operation device.

12. The information processing system according to claim 1, further comprising at least a second operation device configured for selective attachment to/detachment from the information processing device, wherein
the second power supply circuit is configured to supply power from the second battery to the second operation device based on the second operation device transmitting second remaining charge amount information to the information processing device that satisfies the condition.

13. The information processing system according to claim 1, wherein
the first operation device further includes a control, and
the second control circuit is configured to execute a game process based on an operation performed on the control.

14. The information processing system according to claim 1, wherein
the second power supply circuit is configured to, based on the amount of charge remaining in the second battery being less than or equal to a first value, stop supplying power from the second battery to the first operation device, regardless of the amount of remaining charge indicated by the first remaining charge amount information.

* * * * *